United States Patent [19]

Kloker

[11] Patent Number: 4,652,997
[45] Date of Patent: Mar. 24, 1987

[54] METHOD AND APPARATUS FOR MINIMIZING OVERHEAD WHEN EXECUTING NESTED DO LOOPS

[75] Inventor: Kevin L. Kloker, Arlington Heights, Ill.

[73] Assignee: Motorola, Inc., Schaumburg, Ill.

[21] Appl. No.: 802,490

[22] Filed: Nov. 27, 1985

[51] Int. Cl.⁴ ............................................. G06F 9/40
[52] U.S. Cl. .................................................... 364/200
[58] Field of Search ............... 364/736, 200 MS File, 364/900 MS File

[56] References Cited

U.S. PATENT DOCUMENTS

| | | | |
|---|---|---|---|
| 4,097,920 | 6/1978 | Ozga | 364/200 |
| 4,099,230 | 7/1978 | Mead | 364/200 |
| 4,292,667 | 9/1981 | Catiller et al. | 364/200 |
| 4,462,074 | 7/1984 | Linde | 364/200 |

*Primary Examiner*—Thomas M. Heckler
*Attorney, Agent, or Firm*—John A. Fisher; Jeffrey Van Myers; Robert L. King

[57] ABSTRACT

A data processing system having apparatus for selectively executing nested do loops with minimum overhead is provided. The apparatus may be added to a system which executes do loops. The method of execution of the do loops may be any of a myriad of conventional methods. Memory storage is provided for storing the number of iterations remaining in a do loop and an active loop flag. The active loop flag indicates that a do loop is active and enables the do loop apparatus. The active loop flag also indicates whether the data stored in memory is associated with an active loop. New parameters relating to the nested do loop may be used by the same circuitry which executes the do loop thereby eliminating duplication of circuitry. Upon termination of the nested do loop, the memory storage restores the information required to complete the do loop by the apparatus.

5 Claims, 1 Drawing Figure

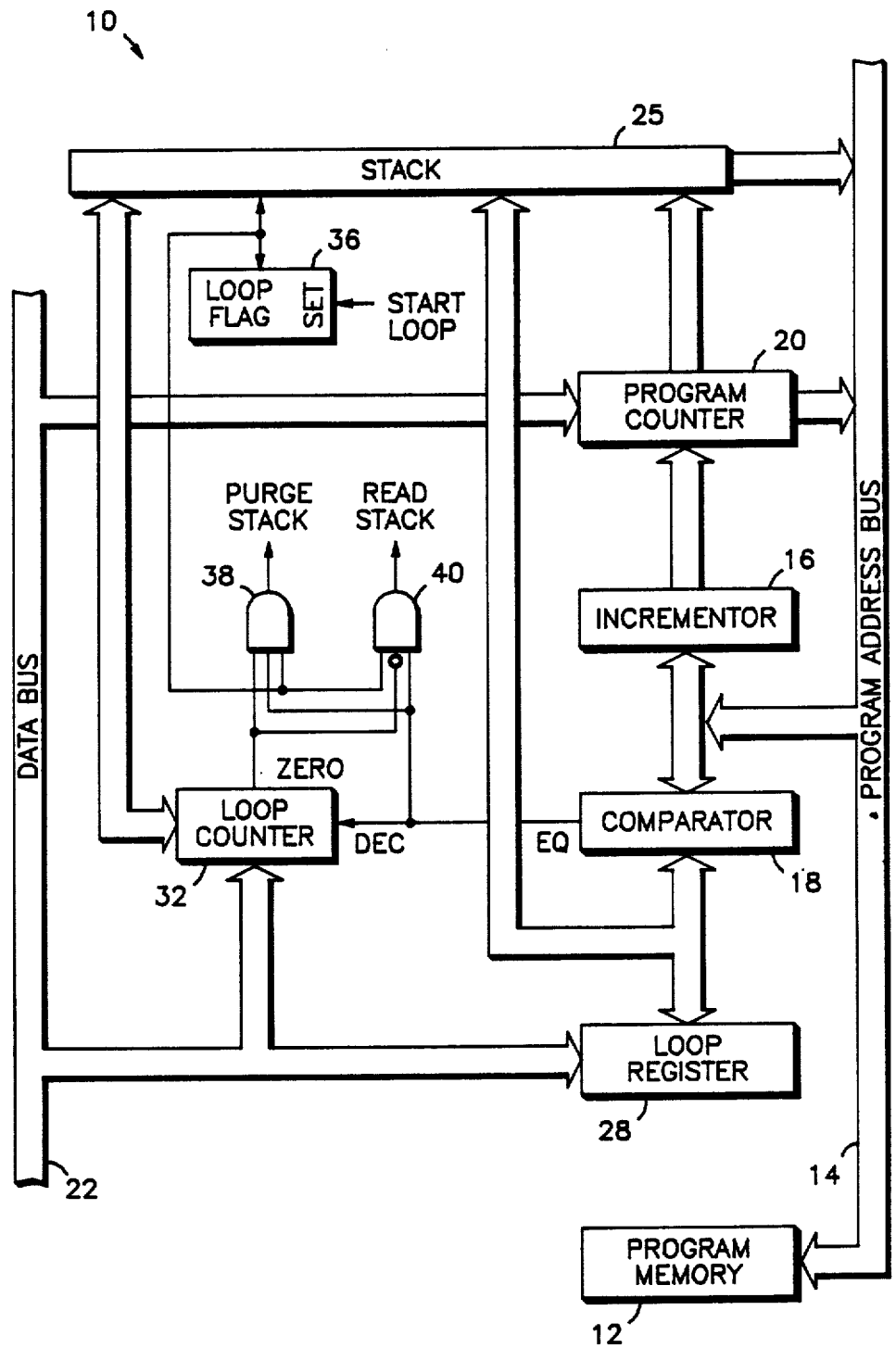

METHOD AND APPARATUS FOR MINIMIZING OVERHEAD WHEN EXECUTING NESTED DO LOOPS

TECHNICAL FIELD

This invention relates generally to data processing circuitry, and more particularly, to the execution of nested do loops in data processing circuitry.

BACKGROUND ART

Data processors typically execute sequences of program steps in repetitive fashion commonly known as a do loop. Frequently, the execution of a do loop contains the execution of one or more separate internal do loops. A do loop which is located internal to another do loop is commonly referred to as a nested do loop. Do loops are typically implemented in software by decrementing an iteration count value and performing a jump to the start of the do loop if the iteration count value is not zero. If the iteration count value is zero, the jump to the start of the do loop does not occur and the instructions after the do loop are executed normally. Implementations of do loops by software require no support hardware but have a disadvantage of additional overhead cycles within the do loop execution. Nested do loops are no different in this respect. Since the inner loop steps are executed more frequently than the outer loop steps, reducing the overhead cycles associated with nested do loops is desirable. If the execution of a do loop and a nested do loop were performed by software, the inner loop overhead cycles would be very large. Do loop circuits have been implemented in hardware to reduce the overhead cycles associated with the loop control software. A hardware do loop must initially be set up by defining both the number of repetitions required and a sequence of steps to execute. The do loop hardware must decide at the end of each iteration of steps in a do loop whether to continue the loop or exit from the loop. Linde in U.S. Pat. No. 4,462,074 teaches the minimization of overhead associated with do loops by eliminating the inclusion in the do loop of steps for determining when a do loop has been completed. However, to effect nested do loops, the apparatus which executes do loops typically must itself be nested or duplicated as suggested by Linde. Such an implementation of nested do loops in duplicated hardware is very costly.

BRIEF DESCRIPTION OF THE INVENTION

Accordingly, an object of the present invention is to provide an improved method and apparatus for minimizing overhead when executing nested do loops.

Another object of the present invention is to provide an improved circuit for effecting one or more do loops within a do loop.

Yet another object of the present invention is to provide an improved method for adding the capability to perform nested do loops to circuitry implementing conventional do loops with minimal additional overhead.

In carrying out the above and other objects of the present invention, there is provided, in one form, a data processing system having apparatus for executing steps of a do loop. The do loops form programs within a program memory. The present invention selectively executes steps of a nested do loop within the do loop with no additional overhead cycles. A first circuit portion is provided for executing the do loop and selectively executing the nested do loop. A second circuit portion indicates whether the do loop or the nested do loop is being executed. A third portion is coupled to the first and second circuit portions for selectively storing both the contents of the second circuit portion and active parameters of the do loop processed by the first circuit portion. The selective storing occurs upon initiation of the nested do loop. The active parameters define at least how many iterations of the do loop remain to be executed. The contents of the second circuit portion are selectively restored to the first circuit portion along with the active parameters of the do loop upon termination of the nested do loop by the first circuit portion.

These and other objects, features and advantages will be more clearly understood from the following detailed description taken in conjunction with the accompanying drawings.

BRIEF DESCRIPTION OF THE DRAWING

The single FIGURE illustrates in block diagram form a nested do loop circuit in accordance with the present invention.

DETAILED DESCRIPTION OF THE INVENTION

Shown in the FIGURE is a nested do loop circuit 10 for interfacing with a program memory 12 via a program address bus 14. Program address bus 14 is coupled to both an input of an incrementor circuit 16 and a first input of a comparator circuit 18. An output of incrementor 16 is coupled to a first input of a program counter (PC) 20. A data bus 22 is coupled to a second input of program counter 20. A first output of program counter 20 is coupled to program address bus 14, and a second output of program counter 20 is coupled to a first terminal of a stack memory 25. A second input of comparator 18 is coupled to a terminal of a loop register (LR) 28. Both the terminal of loop register 28 and the second input of comparator 18 are also coupled to a second terminal of stack memory 25. Data bus 22 is also coupled to an input of loop register 28. An output of comparator 18 is coupled to a first terminal of a loop counter (LC) 32. Data bus 22 is also coupled to a second terminal of loop counter circuit 32. A third terminal of stack memory 25 is coupled to both a first terminal of a loop flag (LF) register 36 and to respective first inputs of AND gates 38 and 40. A control signal labeled "start loop" is coupled to a set terminal of loop flag register 36. An output of loop counter 32 is coupled to an inverted second input of AND gate 40. An output of comparator 18 is coupled to both a second input of AND gate 38 and to a third input of AND gate 40. The output of loop counter 32 is also coupled to a third input of AND gate 38. An output of AND gate 38 provides a "purge stack" control signal, and an output of AND gate 40 provides a "read stack" control signal. A fourth terminal of stack memory 25 is coupled to a third terminal of loop counter 32.

It should be well understood that the present invention may be utilized with any type of data processing system which is capable of executing do loops according to programs stored within a program memory. The present invention is illustrated with the data processing apparatus taught by Linde in U.S. Pat. No. 4,462,074 for purposes of illustration only. Further, other embodiments of the present invention for use with the Linde apparatus will also be described below.

In operation, nested do loop circuit 10 functions to execute a do loop during which circuit 10 may also execute a nested do loop. Initially, assume that a do loop operation is in progress. Again, the exact specifics of how the do loop is being executed is not a limiting feature of the present invention. For the purpose of illustration only, initially assume that loop flag register 36 is not present in circuit 10 and that AND gates 38 and 40 only receive input signals from loop counter 32 and comparator 18. In the illustrated form, data for executing the do loop is initially coupled to circuit 10 via data bus 22. The first step of the do loop is stored in program counter 20 via data bus 22. Loop register 28 receives and stores the address of the final step of the do loop. The number of iterations in the do loop minus one is stored in loop counter 32. Program counter 20 stores and couples the address of the first step of the do loop to be executed to program memory 12. The step is executed by circuitry not shown. Program counter 20 also couples the first step of the do loop to stack memory 25 for storage. In response to the first step address being coupled to program address bus 14, incrementor circuit 16 increments program counter 20 to the next sequential address in the do loop. In this manner, the address of the next step of the do loop is coupled by program counter 20 to program memory 12 for execution and incrementor 16 cycles program counter 20 through the addresses of the do loop. After each address has been coupled to program address bus 14, comparator 18 functions to compare the address on bus 14 with the last address of the do loop stored in loop register 28. Only when both addresses are equal does comparator 18 couple a signal to loop counter 32 indicating that a complete iteration of the do loop has been executed. In response, loop counter 32 is decremented. If loop counter 32 has not counted down to zero indicating that the do loop has been executed a predetermined number of iterations, loop counter 32 provides a control signal to inputs of AND gates 38 and 40 which makes AND gate 40 provide a "read stack" signal. The read stack signal causes stack memory 25 to couple the stored first address of the do loop to program memory 12 via bus 14 for execution again. The do loop continues to be executed in a similar manner until the last step of the last iteration is reached. At this point, comparator 18 provides a decrement control signal which causes loop counter 32 to provide a zero control signal which makes AND gate 38 conductive. AND gate 38 provides a "purge stack" signal which removes the address of the first step of the do loop just completed from stack memory 25. Incrementor 16 increments program counter 20 which couples the address of the first step after the do loop to program memory 12.

Up to this point in the discussion, a conventional do loop circuit operation has been discussed. Loop flag register 36, which was previously omitted from discussion, functions to provide an easily determinable indication whether or not an active do loop is being processed. Loop flag register 36 only needs to be a one bit storage register so that a logic one value indicates circuit 10 is active and a logic zero indicates that circuit 10 is inactive. The loop flag register 36 is initially reset to zero before any operations are performed by the data processor. This disables do loop circuit 10 and indicates that no do loop is active. Since no do loop is active, the values in loop counter 32 and loop register 28 are arbitrary.

Now assume that before the do loop operation just described is completed, another do loop (i.e. a nested do loop) must be executed. Initially, the existing values in loop counter 32, loop register 28 and loop flag register 36 are coupled to stack memory 25. Note that since the current do loop is active, the loop flag value coupled to stack memory 25 is one. The first instruction address of the nested do loop is present in program counter 20. This address value stored in program counter 20 is simultaneously coupled to stack memory 25. After the existing address values in counter 32 and register 28 have been saved, new address values for storage in counter 32 and register 28 are coupled via bus 22 to counter 32 and register 28. Loop flag register 36 is then set by a "start loop" signal which sets the bit in register 36 to a logic one. The loop flag bit in register 36 functions to indicate that the current do loop is active. The logic one loop flag bit is coupled to respective inputs of AND gates 38 and 40 so that these gates may be conductive when appropriate. At this point, nested do loop circuit 10 executes the nested do loop in the same manner as previously described with respect to the do loop. In the event yet another do loop program needs to be executed within the nested do loop, the same procedure of storing the existing active parameters of the nested do loop and loading the new parameters of the interrupting do loop occurs in response to a similar do instruction. For the purpose of illustration, assume that only a single nested do loop exists. At the end of execution of the last instruction in the last iteration of the nested do loop routine, AND gate 38 provides a "purge stack" signal since the loop flag is set. The "purge stack" signal reloads the loop flag register 36, loop counter 32 and loop register 28 with the previous values stored in stack memory 25. Note that the value restored to loop flag register 36 is one since the previous do loop was active. Therefore, circuit 10 will remain active. Incrementor 16 functions to increment program counter 20 by one instruction which is the first address to be executed after completion of the nested do loop. Once the previous values which define the conditions existing prior to execution of the nested do loop are restored, completion of the do loop continues as previously described. Only after the do loop has completed the programmed number of iterations and counter 32 has counted down to zero does AND gate 38 become conductive and provide a "purge stack" control signal. The purge stack control signal retores the stored values for loop counter 32 and loop register 28 and also restores the initial value of zero to loop flag register 36 which resets the loop flag and disables circuit 10. Normal instruction execution continues with the instructions following the do loops.

It should be readily apparent that numerous other variations of the present invention exist. For example, the loop flag bit which indicates the existence of an active loop may be stored in either loop register 28 or loop counter 32 without using a loop flag register as a totally independent register. If the loop flag bit is stored in loop counter 32, the presence of an active loop is simply measured by whether or not loop counter 32 has counted down to zero or not. If the loop counter 32 is zero, then no active do loop exists. In this case, loop counter 32 should detect the value one to determine the last do loop iteration and detect zero to disable circuit 10. Loop counter 32 is then loaded with the number of loop iterations to be executed. Setup and control steps can be readily derived to provide this operation. If the loop flag bit is stored in loop register 28, the presence of an active loop is determined by whether or not the value stored in loop register 28 is a permissible value for program counter 20. If the value stored in loop register 28 is one of the possible values for program counter 20, there is an active do loop. Otherwise, no active do loop exists. Setup and control steps can also be readily derived to provide this operation.

By now it should be apparent that a nested do loop circuit has been provided for use with a circuit capable of performing do loops. The added capability of performing nested do loops has been provided by adding very little additional hardware and control requirements to the do loop circuit. Therefore, overhead has been minimized and speed of operation has not been sacrificed. Any plurality of nested do loops may be effected with the present invention.

While an embodiment has been disclosed using certain assumed parameters, it should be understood that certain obvious modifications to the circuit or the given parameters will become apparent to those skilled in the art, and the scope of the invention should be limited only by the scope of the claims appended hereto.

I claim:

1. In a data processing system having apparatus for executing steps of a do loop, said do loops forming programs within a program memory of the data processing system, a combination for executing steps of at least one nested do loop within the do loop, comprising:
    first means for executing the do loop and selectively executing the nested do loop;
    second means for indicating whether the do loop or the nested do loop is being executed; and
    third means coupled to the first and second means, for selectively storing contents of the second means and active parameters of the do loop processed by the first means upon initiation of the nested do loop, said active parameters defining at least how many iterations of the do loop remain to be executed, and for selectively restoring the contents of the second means and the active parameters of the do loop to the first means upon termination of the nested do loop by the first means.

2. The apparatus of the data processing system of claim 1 wherein said first means further comprise:
    fourth means for determining, while each program step of a do loop or nested do loop is being executed, whether the program step of the loop is a final step;
    fifth means for determining, during each execution of said final step, whether said loop has been executed a predetermined number of times; and
    sixth means for thereafter executing again said loop if the fifth means indicates the loop has not been executed the predetermined number of times, or for otherwise causing the apparatus to exit from the loop.

3. The apparatus of the data processing system of claim 1 wherein said third means comprise a stack memory.

4. A method of executing steps of a nested do loop in a data processing system having apparatus for executing program steps of a do loop, comprising the steps of:
    forming a do loop having at least one nested do loop within a program memory of the data processing system;
    providing a flag upon starting execution of the do loop indicating a do loop is active;
    executing the steps of the do loop prior to a first program step of at least one nested do loop;
    storing active parameters of the do loop in response to the first program step of the nested do loop, the active parameters defining how many iterations of the do loop remain to be executed;
    storing the flag indicating that a do loop was previously being executed;
    coupling new parameters associated with the nested do loop to the apparatus;
    setting the flag indicating that a loop is presently being executed;
    executing the nested do loop with substantially the same apparatus which executes the do loop;
    detecting a final program step of a final iteration of the nested do loop;
    restoring the active parameters of the do loop to the apparatus upon completion of execution of the final program step of the nested do loop;
    restoring the flag indicating that a loop was previously being executed; and
    completing execution of the program steps of the do loop.

5. A nested do loop circuit for executing a nested do loop in a data processing system having an addressable program memory, comprising:
    program register means for selectively receiving and storing addresses corresponding to steps of the do loop and nested do loop stored in the program memory;
    incrementor means coupled to the program register means for incrementing the program register means to a successive program address upon completion of execution of each do loop or nested do loop step;
    comparator means coupled to the incrementor means for comparing a stored last address value with an address from the program counter means for each do loop or nested do loop step to determine when a loop has reached a final step;
    counter means coupled to the comparator means for counting a predetermined number of iterations of the do loop and nested do loop;
    storage means coupled to the counter means, the comparator means and program register means, for selectively storing parameters of the counter means, the comparator means and program register means;
    active loop flag means coupled to the storage means, for storing a flag parameter indicating whether a loop is currently being processed; and
    control means coupled to the counter means and storage means, for selectively reading previously stored parameters of the program register means from the storage means to the program register means and comparator means, and for selectively purging previously stored parameters from the storage means and restoring said parameters to the counter means, comparator means and the active loop flag means.

* * * * *